(No Model.)
G. H. SAWYER.
CULTIVATOR.
No. 348,242. Patented Aug. 31, 1886.
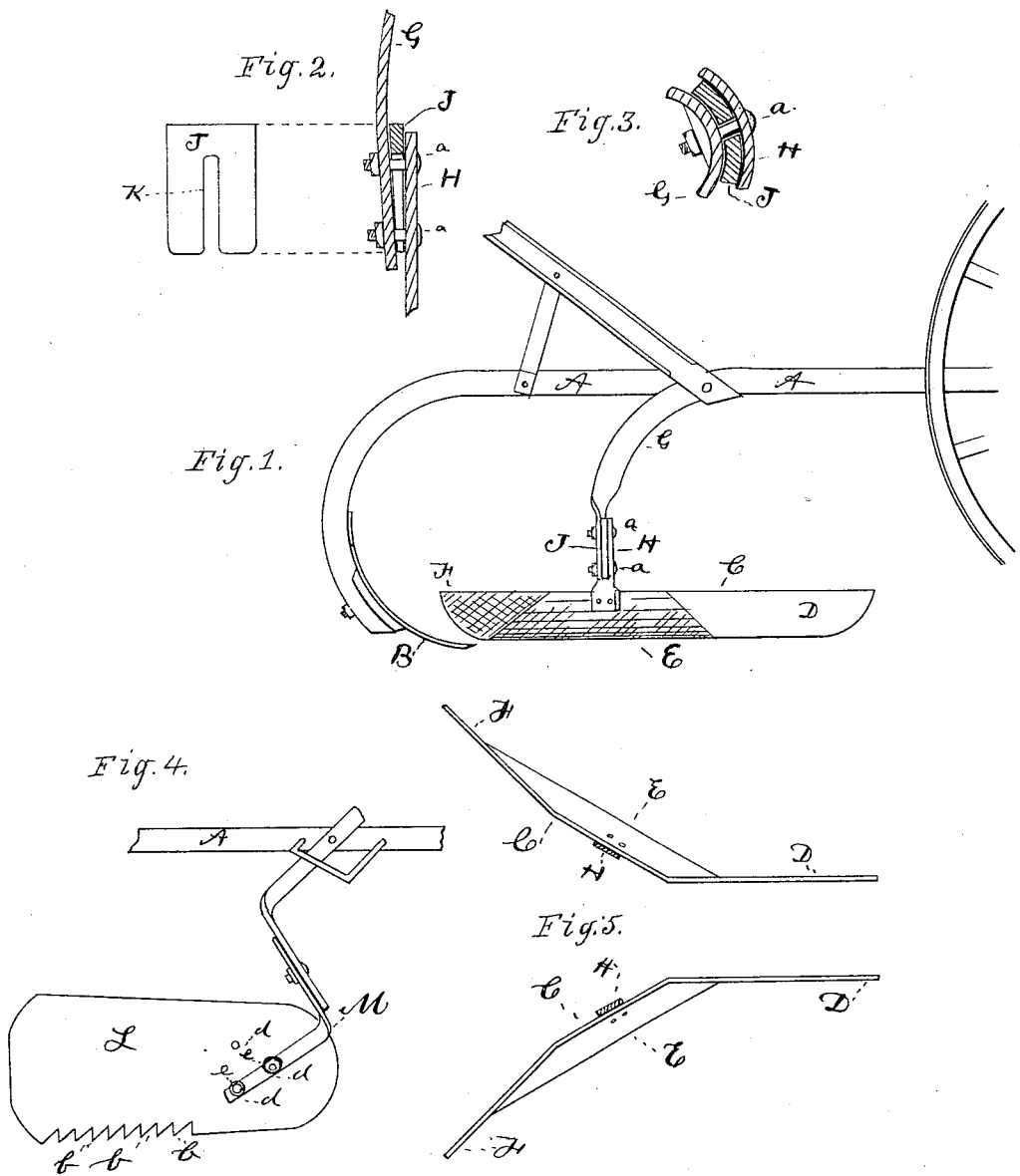
Witnesses:
E. J. Hoover
Geo. S. Hoover
Inventor:
George Henry Sawyer,
By Manahan & Ward
His Attys.

UNITED STATES PATENT OFFICE.

GEORGE HENRY SAWYER, OF LAMOILLE, ILLINOIS.

CULTIVATOR.

SPECIFICATION forming part of Letters Patent No. 348,242, dated August 31, 1886.

Application filed May 10, 1886. Serial No. 201,676. (No model.)

*To all whom it may concern:*

Be it known that I, GEORGE HENRY SAWYER, a citizen of the United States, residing at Lamoille, in the county of Bureau and State of Illinois, have invented certain new and useful Improvements in Corn-Cultivators; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention has reference to certain improvements in corn-cultivators, and pertains more especially to a knife for running close to the corn-hills, and also a reversible shield, having one smooth edge, and the opposite edge furnished with teeth projecting to the rear.

My invention is applicable to "straddle-row" or two-horse cultivators or shovel-plows, and as each half of the cultivator is identical in construction with the other half I do not deem it necessary to show or describe more than one-half of the machine.

In the drawings, Figure 1 is a side elevation of a machine provided with my knife. Fig. 2 exhibits details of the mode of connecting the knife to its supporting-standard, and shows the interposed wedge for varying the inclination of such knife. Fig. 3 is a cross-section of the attachment of said knife to its standard. Fig. 4 exhibits the shield and its mode of attachment to the beam. Fig. 5 is a plan of the knives in position for work, one on each side of the corn-row.

A is the usual cultivator-beam.

B is the usual cultivator or plow shovel.

C is the knife referred to, and consists of three parts—the front or vertical portion, D, the central portion, E, outwardly sloped toward the bottom, and the rear portion, F, sloped outwardly at the top.

The portion D of the knife C is held vertically on its lower edge, and is thus progressed in the direct line of the movement of the machine, and is peculiarly adapted for the cultivation of the corn in the earliest stages of the growth of the latter, which is the chief advantage I claim for the knife C. The part D enters the ground about two inches, and has no other effect than to cut a vertical gash in the earth. For the reason that the portion D has no action on its sides—that is, does not tend to move the earth—it can be run very close to the young corn without danger of throwing clods on the latter.

The portion E of the knife C, having its lower edge sloped from the corn, has the effect of crowding from the corn and into the path of the shovel B, following the outer wall of the gash cut by the portion D, and with such wall the small weeds growing on the strip next such wall. The rear portion, F, of the knife C being turned outward at its top tends to cover such weeds, the latter process being completed by the shovel B.

The knife C is attached to the beam in front of the shovel which is next the corn by any suitable downwardly-projecting standard, G. A short stem, H, is attached to the central portion of the knife C, and, projecting upward past the lower end of the standard G, is fastened to the latter by two transverse bolts, *a a*.

Between the standard G and stem H is interposed the vertical wedge J, having the central slot, K, to bestride the bolts *a*, and held in place by the compression of the latter. By inserting the wedge J to different degrees, or by reversing it, the knife C can be set at different angles laterally. This adjustment is more particularly applicable to the parts E and F, to adapt them to the varying qualities and conditions of ground.

It will be observed that no part of the knife C has any action on the ground inside or toward the corn-row.

L is a shield having one smooth edge and one edge provided with rearwardly-extending teeth *b*, which, while they tear up small weeds and grass, do not, by reason of their rearward projection, drag along such weeds and grass.

The shield L is provided with three holes, *d d d*, arranged in triangular relation, in the lower two of which (whichever side of the shield may be upward) the lower end of the brace M is fastened by suitable bolts, *e*. The upper end of the brace M is suitably attached to the beam A, so as to drag in the usual way between the corn and the shovel nearest thereto.

What I claim as my invention, and desire to secure by Letters Patent of the United States, is—

1. The knife C, provided with a front vertical portion, D, a central outwardly-sloping portion, E, and a rear inwardly-turned portion, F, substantially as shown, and for the purpose described.

2. The combination of the knife C, stem H, standard G, wedge J, and bolts a, whereby the lateral inclination of such knife can be adjusted at will, substantially as shown.

3. In combination with the beam A of a corn-cultivator, the brace M and shield L, the latter being provided on one of its edges with teeth b, projected toward the rear of the machine, and with the diagonally-placed holes d, whereby said shield may be reversed, and have either a rough or smooth action on the ground, substantially as shown.

In testimony whereof I affix my signature in presence of two witnesses.

GEO. HENRY SAWYER.

Witnesses:
M. H. BURTON,
JOSEPH H. CHAMBERLIN.